United States Patent
Braunstein et al.

[11] 3,732,429
[45] May 8, 1973

[54] LIQUID CRYSTAL DEVICE

[75] Inventors: Morris Braunstein, Marina del Rey; William P. Bleha, Jr., Santa Monica, both of Calif.

[73] Assignee: Hughes Aircraft Company, Culver City, Calif.

[22] Filed: Nov. 12, 1971

[21] Appl. No.: 198,281

[52] U.S. Cl....250/213 R, 250/83.3 HP, 350/160 LC
[51] Int. Cl..........G01t 1/16, G02f 1/28, H01j 31/50
[58] Field of Search..................250/213 R, 83.3 HP; 350/160 LC

[56] References Cited

UNITED STATES PATENTS

| | | | |
|---|---|---|---|
| 2,892,380 | 6/1959 | Baumann et al. | 350/160 R |
| 3,592,527 | 7/1971 | Conners | 350/160 LC |
| 3,663,086 | 5/1972 | Assouline | 350/160 LC |
| 3,666,881 | 5/1972 | Stein | 250/213 R |

*Primary Examiner*—James W. Lawrence
*Assistant Examiner*—T. N. Grigsby
*Attorney*—W. H. MacAllister, Jr.

[57] ABSTRACT

The liquid crystal device comprises a liquid crystal layer, a thin photoconductor layer, and a thin insulator layer sandwiched between the transparent supporting covers having a transparent electrically-conductive layer thereon. The photoconductor layer is cadmium sulphide (CdS) and the insulator layer is zinc sulphide (ZnS).

18 Claims, 8 Drawing Figures

PATENTED MAY 8 1973 3,732,429

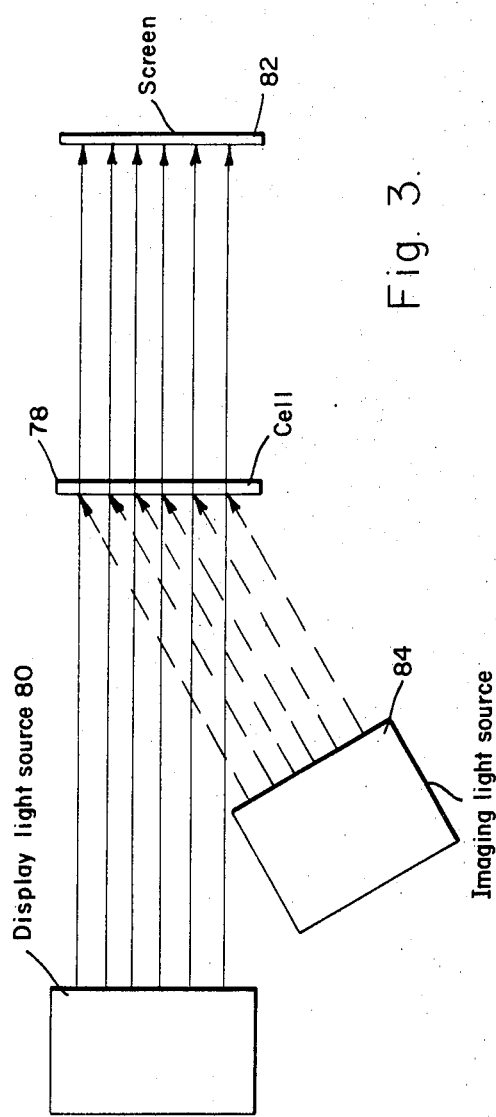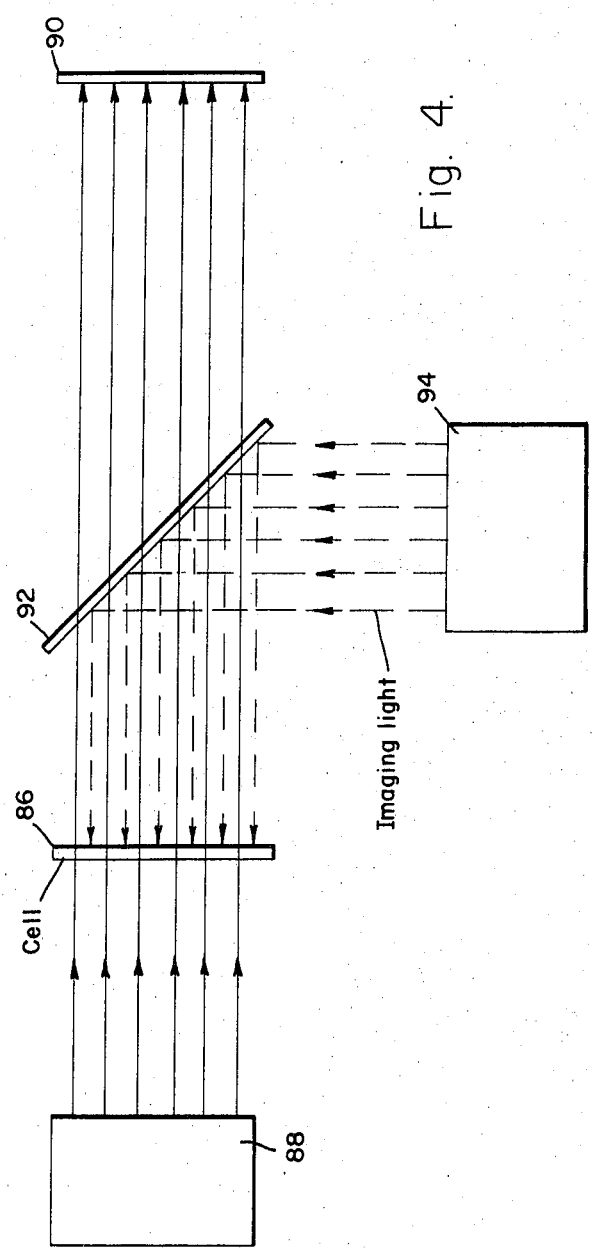

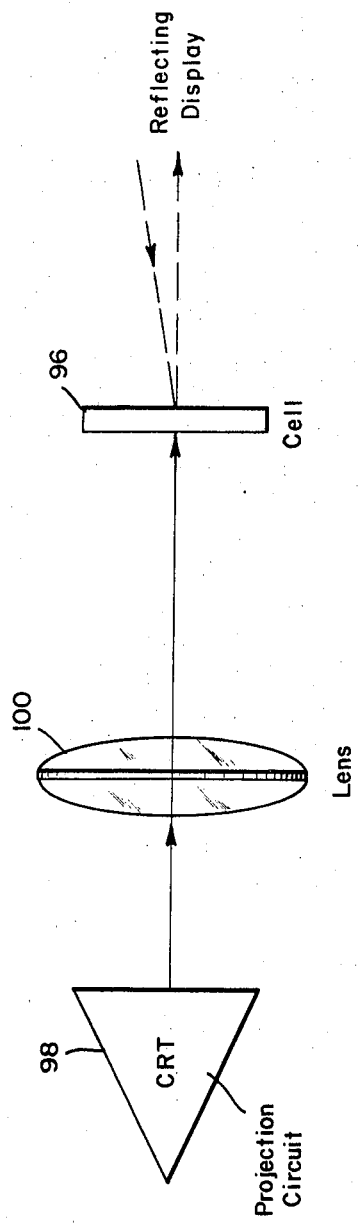
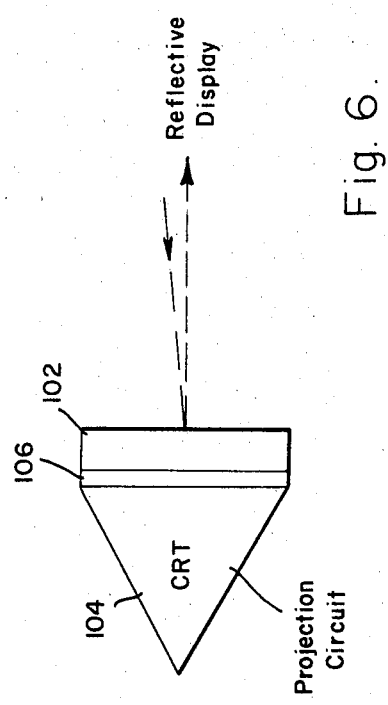

LIQUID CRYSTAL DEVICE

BACKGROUND

This invention is directed to a liquid crystal device which includes a photoconductor layer and insulator layer which operate in conjunction with the liquid crystal.

At the present time, numerous nematic liquid crystals, suited for use in accordance with the teachings of the present invention, are known which possess the property of being responsive in localized regions to suitable applied electric fields by forming regions or areas which are usable as images. For the purpose of better defining the present invention it may be noted that liquid crystals can be classified as being either nematic, smectic, or cholesteric and that the present invention primarily pertains to the use of nematic liquid crystals. Nematic liquid crystals have special properties which afford certain advantages put to use in the present invention. The present invention therefore is concerned broadly with applications for nematic liquid crystals heretofore unknown notwithstanding extensive work done in the past with liquid crystals including nematic liquid crystals.

Specific nematic liquid crystals possess the attribute of having liquid crystalline structure over a wide temperature range (known as the nematic range) wherein such crystals can be affected by electric fields of sufficient strength in a manner productive of image formation inside the crystal. The mechanism of image formation best understood has been called "scattering" of nematic liquid crystal molecules. This involves change in the optical reflectivity or transmissivity of the crystal. Image formation can, as stated earlier, be produced by using an electric field. It is not necessarily the case that image formation will occur due to " scattering." Other electric field responsive effects presently under study may also underlie the establishment of image defining areas or states. The present invention in a fundamental sense makes use of an electric field for image formation inside nematic liquid crystals irrespective of the precise manner in which the field causes the image defining areas and is not necessarily limited to the usage of such crystals in a dynamic scattering mode of operation.

In accordance with the present invention various nematic liquid crystals have been utilized either alone or in combination with other liquid crystals or other material to provide a "nematic liquid crystal substance." Different categories of nematic liquid crystal substances are utilized according to the invention to obtain certain desired properties, or modifications of nematic liquid crystal properties. As will be specified hereinafter the nematic liquid crystal substances found best suited for the purposes of the present invention fall generally into three different categories. These categories may be denoted by reference to the appearance of a thin film or layer of the various nematic liquid crystal substances employed and the effect on the appearance of an image producing electric field. One category involves substances including or composed of a nematic liquid crystal which provide an essentially transparent (colorless or clear) layer which can form, by dynamic scattering mode operation, a light scattering electric field induced image (as for example milky white) in the substance selected for use. Another category involves substances like those in the first category which include in addition to a nematic liquid crystal a small amount of a cholesteric material to provide an essentially transparent layer which can form, by an emulsion storage effect or dynamic scattering mode of operation, a light scattering electric field induced image (as for example milky white) in the substance. Another category involves substances like those in the first category which include in addition to a nematic liquid crystal a pleochroic or dichroic dye material which imparts the color of the dye to the substance which can be modified, either with or without dynamic scattering mode operation, by an electric field to produce an electric field induced image of a different shade of the color of the dye. Nematic liquid crystal substances falling generally into these categories are given below by way of example and these substances may be used in accordance with the teachings of the present invention.

SUMMARY

In order to aid in the understanding of this invention it can be stated in essentially summary form that it is directed to a liquid crystal device and method of manufacture thereof. The liquid crystal device includes an insulating layer and photoconductive layer in optical association with a nematic or nematic/cholesteric liquid crystal. In addition, the device includes substantially transparent electrically conductive layers by which an electric field can be applied to the liquid crystal.

Accordingly, it is an object of this invention to provide a liquid crystal device which employs a photoconductor in cooperation with a scattering mode of liquid crystal. It is a further object of this invention to employ insulator and photoconductor layers, which cooperate with a liquid crystal for image production in cooperation with the liquid crystal. It is also an object of this invention to provide a method for the deposition of layers of photoconductors which will be adjacent the liquid crystal layer upon completion of the liquid crystal device.

It is still another object to provide a method for deposition of a photoconductor which includes vacuum deposition, and the use of temperature differentials of various surfaces in the deposition chamber to obtain the desired deposit. It is yet another object to provide such a method, including post deposition thermal processing and appropriate atmosphere control, during such thermal processing.

Other objects and advantages of this invention will become apparent from a study of the following portion of the specification, the claims and the attached drawings.

BRIEF DESCRIPTION OF THE DRAWINGS

FIG. 3 shows the manner in which either of the cells of FIG. 1 or 2 can be employed in conjunction with a projection light source wherein the image information on the liquid crystal cell is projected onto screen;

FIG. 4 is similar to FIG. 3, but showing a different manner of application of the image information containing exposure light source;

FIG. 5 is a schematic showing of the manner in which either of the cells of FIGS. 1 and 2 can be employed with a cathode ray tube used for image information, together with reflective display;

FIG. 6 is similar to FIG. 5, showing another schematic arrangement thereof;

DESCRIPTION

Figure 1:
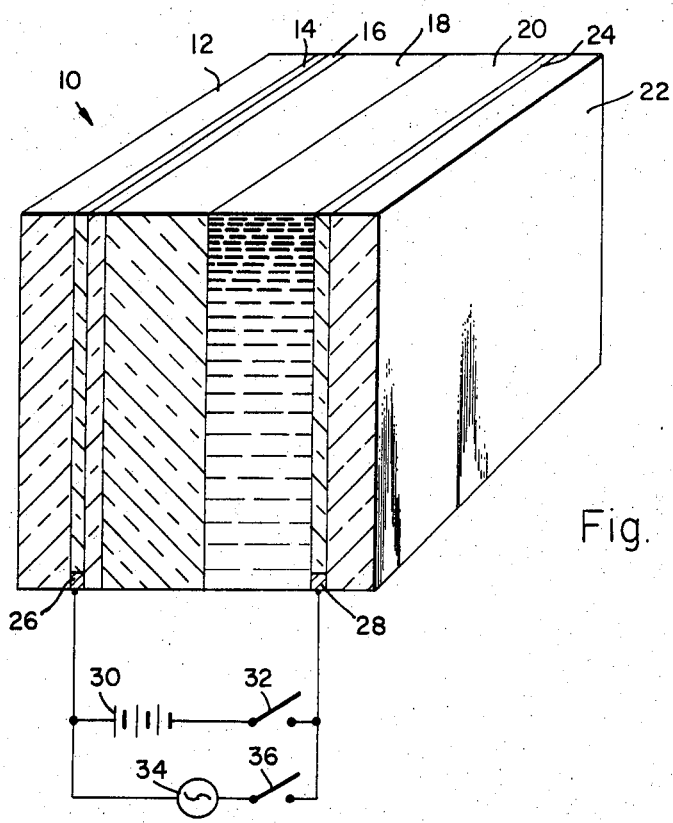
FIG. 1 is an isometric view of a portion of the basic cell structure and showing a vertical section therethrough together with schematic electrical connections thereto.

FIG. 1 illustrates a first embodiment 10 of a basic cell arrangement. The cell is a laminar structure. Glass substance 12 is ordinary clear glass, and since it can be used for transmitted light therethrough, it is preferably clear and flat, with its outer surfaces substantially parallel. Transparent, electrically conductive coating 14 is applied to one side of the glass. This coating is specifically antimony doped tin oxide, commercially known as NESA glass, or tin doped indium oxide. Glass substance 12 is conveniently one-eighth inch thick while the electrically conductive coating 14 therein is of such thickness as to give a resistance in the range from 1 to $10^3$ ohms per square. Instead of employing NESA glass, another convenient substantially transparent and electrically conductive coating as taught by Alfred F. Kaspaul U.S. Pat. No. 3,698,946, can be employed.

Vacuum deposited onto the coating 14 is a thin layer as the insulator zinc sulphide, illustrated of the layer 16. Thin insulator films of materials such as silicon dioxide or silicon monoxide could also be used. The insulator 16 is in the range from 10 to $10^2$ nm in thickness, and the presently considered optimum thickness is 50 nanometers. Over the zinc sulphide layer 16 is vacuum deposited layer 18 of the photoconductor cadmium sulphide. Photoconductor films of cadmium selenide could also be used. The photoconductor layer 18 is vacuum deposited to a thickness of from 2.0 to 12.5 microns.

On top of the photoconductor layer 18 is deposited a liquid crystal layer 20. The liquid crystal layer 20 is a nematic-cholesteric liquid crystal, of the type defined in an article entitled "A New Electric Field Controlled Reflective Optical Storage Effect In Mixed Liquid Crystals systems" by G. H. Heilmeier and Joel E. Goldmacher appearing in Volume 13 No. 4 in the Aug. 15, 1968 issue of *Applied Physics Letters* on pages 132 and 133. The thickness of the liquid crystal layer is typically 12.5 microns, and as in conventional liquid crystal practice can conveniently range from 4 to 25 microns. The thickness is contained by spacers positioned around the edges of the cell 10, to maintain the volume in which the liquid crystal 20 is positioned.

The cell is completed by glass 22 on which is coated transparent conductive layer 24. This structurally correspond to the glass 12 in transparent conductive layer 14, described above. The two glass layers 12 and 22 thus define the outer surfaces of cell 10.

Electric contacts 26 and 28 are respectively connected to the electrically conductive substantially transparent layers 14 and 24. Source 30 of direct current, together with its series control switch 32, are connected across the contacts 26 and 28. The closure of switch 32 applies a dc field across the layers between the electrically conductive layers 14 and 24. AC source 34 and its serially connected switch 36 are also connected across contacts 26 and 28, in parallel to the dc source and switch. The ac source provides ac current from 1,000 to 100,000 Hertz.

Figure 2:
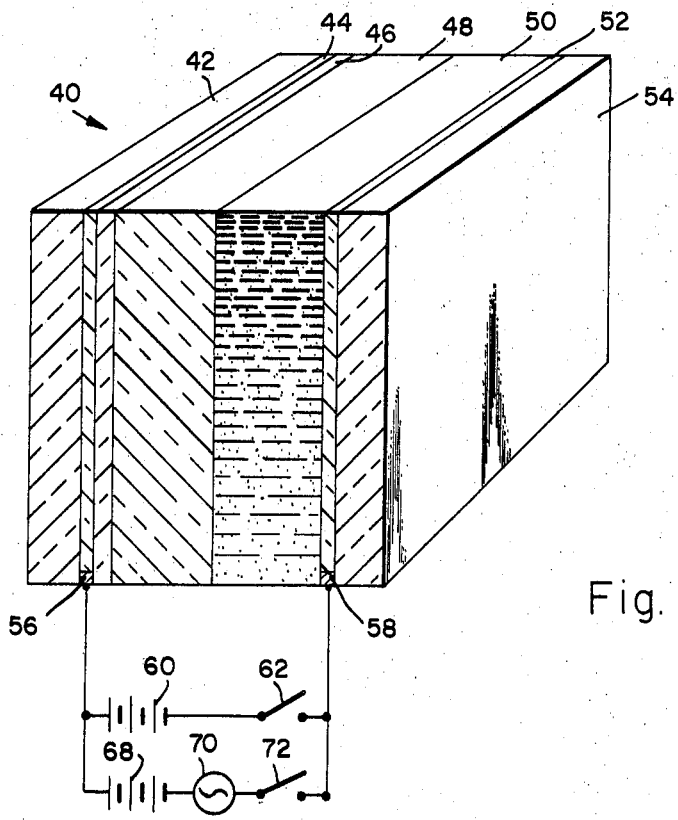
FIG. 2 shows a cell similar to the cell of FIG. 1, and shows its schematic electrical connection.

FIG. 2 illustrates a cell 40 which is a second embodiment of the liquid crystal device in accordance with this invention. Cell 40 is built off of a plurality of layers, comprising glass layer 42, transparent conductive layer 44, zinc sulphide insulating layer 46, cadmium sulphide photoconductive layer 48, liquid crystal layer 50, transparent conductive layer 52 and glass cover 54. The layers 42, 44, 46, 48, 52 and 54 are respectively of an equal thickness to layers 12, 14, 16, 18, 24 and 22 of the cell 10 shown in FIG. 1 and described with respect thereto. Furthermore, the method of formation of these various layers is the same in both cells. The principle difference between the cells is that the layer 50 is a nematic liquid crystal, such as those described in the background references.

Electric contacts 56 and 58 are respectively connected to substantially transparent conductive layers 44 and 52. Electrically connected to these contacts are the series combination of dc voltage source 60 and its switch 62. This is identical to the D.C. source 30. In addition, in the embodiment of FIG. 2, a combined dc and ac source is connected across the contacts 56 and 58, in parallel to the dc sources 60. Thus, dc source 68 is connected to one of the contacts, and through ac source 70 and switch 72 to the other of the contacts. By closure of switch 72, an ac field with a superimposed dc field is applied between the substantially transparent layers 44 and 52. Thus, the cells 10 and 40 are the same, except for the differences between the liquid crystal layers, and the fact that the nematic liquid crystal layer 50 also has the capability of having a combined field applied thereacross.

The method of manufacture of the insulating layer 16 and the photoconductive layer 18, and their corresponding layers 46 and 48, is as follows.

In the first step of manufacture, the transparent conductive coating-glass combination 12 and 14 is cleaned for use as a substrate in a high vacuum deposition process. There are many methods, well-known in the art, to accomplish this. In the second step the zinc sulphide film is vacuum deposited on the conductive coated glass substrates in a high vacuum coating station. The deposition of zinc sulphide is also well-known in the art, and the procedure described here is not unique to the performance of the device. The method used is to evaporate electronic grade powder or high purity crystalline pieces of zinc sulphide from a resistance-heated molybdenum boat or by electron bombardment from an electron-beam evaporation unit. The pressure in the bell jar during deposition is between $1 \times 10^{-5}$ and $1 \times 10^{-6}$ Torr is not critical. The substrates are placed 10 inches above the evaporation source along with a thickness monitoring instrument, such as quartz crystal deposition thickness transducer. After glow discharge cleaning of the substrates, the ZnS evaporation commences. The films, typically 50 nm.

thick, are deposited in 1 hour, although times of 10 minutes to 2 hours have been used. The films have also been varied in thickness from 10 to 100 nm. with proportional changes in deposition time. After deposition the films are transparent (absorbing no light in the visible spectrum) and thus are characteristic of near-stoichiometric zinc sulphide.

Figure 7:
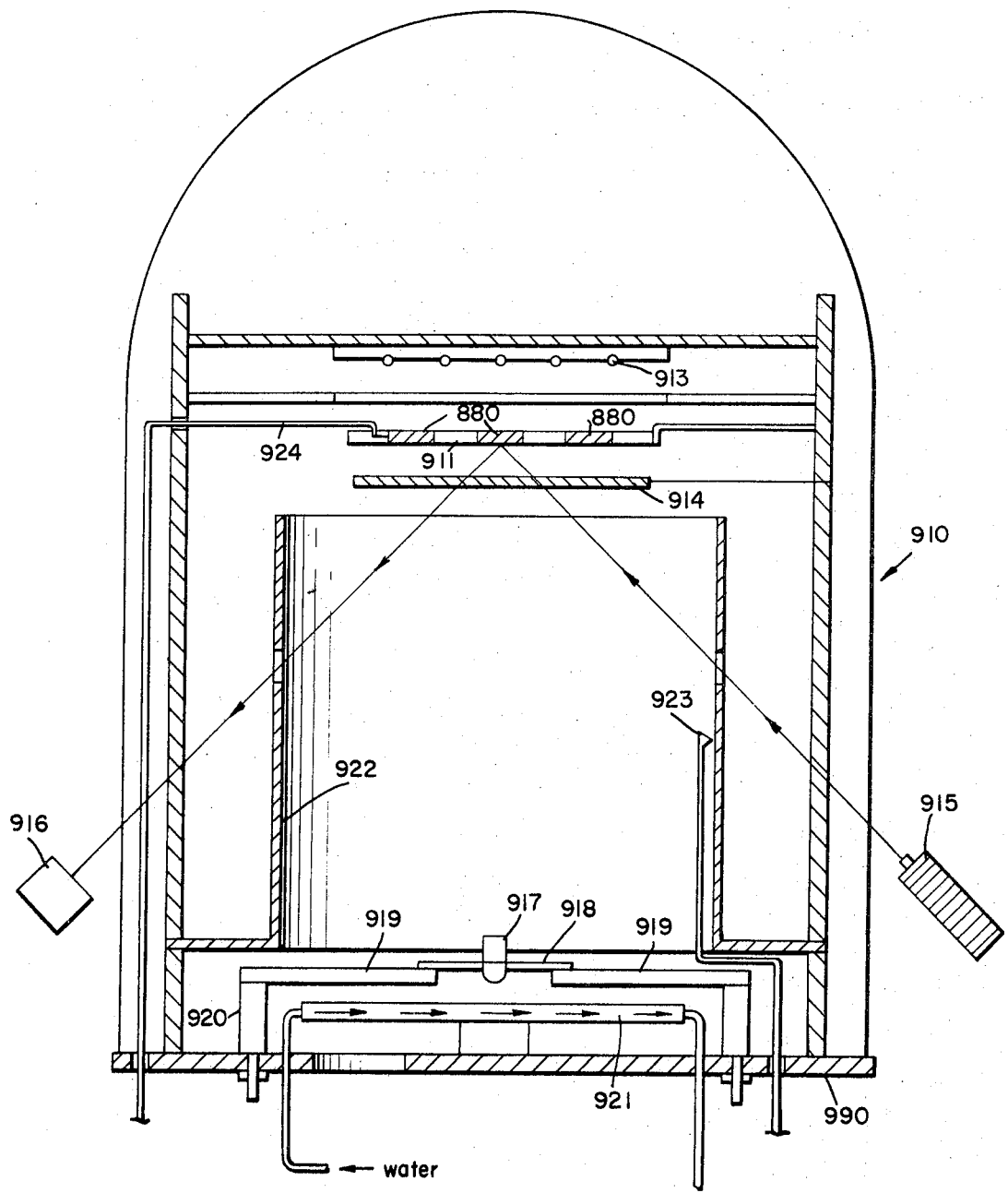
FIG. 7 is a schematic drawing of the CdS thin film vacuum deposition chamber.

The third step in the fabrication is the vacuum deposition of the CdS film 18 on top of the zinc sulfide layer 16. The deposition is done in the bell jar of a conventional high vacuum system in the pressure range of $1 \times 10^{-4}$ to $1 \times 10^{-5}$ Torr. The pressure, however, does not appear to be critical. A cross-section drawing of the instrumentation is shown in FIG. 7. The vacuum is enclosed by a baseplate 990 and a glass bell jar 910. The structures 880 with the zinc sulphide film are held by a stainless steel substrate holder 911 and heated by quartz lamps 913. A removable shutter 914 shields the substrates until deposition on them is to be commenced. The thickness of the CdS films is directly and continuously monitored on a substrate by the use of optical interference. This is accomplished with the use of a laser 915 and detector 916 positioned outside the bell jar 910.

The electronic grade CdS powder, in the form of a pressed cylindrical pellet 917, is evaporated from a formed tantalum boat 918 which is resistively heated by current passing through buss bars 919 and current feedthroughs 920. The boat 918 is designed such that as the CdS evaporates, the pressed pellet 917 settles down into the boat. This gives an efficient thermal evaporation over the long period of time required for the deposition of the CdS films. While this particular configuration gives the characteristics desired, other forms of CdS, such as crystals, and other thermally efficient evaporation sources, such as baffle boxes, could be used to get the same results. The evaporation rate is controlled by controlling the current to the tantalum boat. The current is set so that 2.5 microns of CdS as monitored by optical interference is deposited on the structures 880 in 1 hour. Typical thicknesses of CdS films are 5 – 12.5 microns so that deposition times of 2–5 hours are required. Successful results have been obtained with thicknesses from 2–15 microns and evaporation rates from 0.5 to 10 micron/hr.

To avoid the heating of the various elements in the deposition chamber by radiation from the tantalum boat 918 a water cooled plate 921 is positioned beneath the boat 918 and extending to the diameter of a cylindrical stainless steel deposition chamber 922 positioned around the boat. The water-cooling is also used to maintain the temperature of the wall of chamber 922 as measured by a thermocouple 923 below 60° C. This low temperature, as compared with the structure 880 temperature of 130° C, as measured by a thermocouple 924, is necessary to obtain the desired characteristics in the films. It should be noted, however, that the important fact is that the chamber 922 and baseplate 921 are maintained at a lower temperature than the structure 880 and the methods of achieving this can be determined by one skilled in the art. Also the temperatures given can be changed to vary the conductivity and current-voltage characteristics of the CdS films. A range of substrate temperatures from 100° to 200° C and chamber wall temperatures from 40° to 90° C have been used to make CdS films of the given characteristics.

Figure 8:
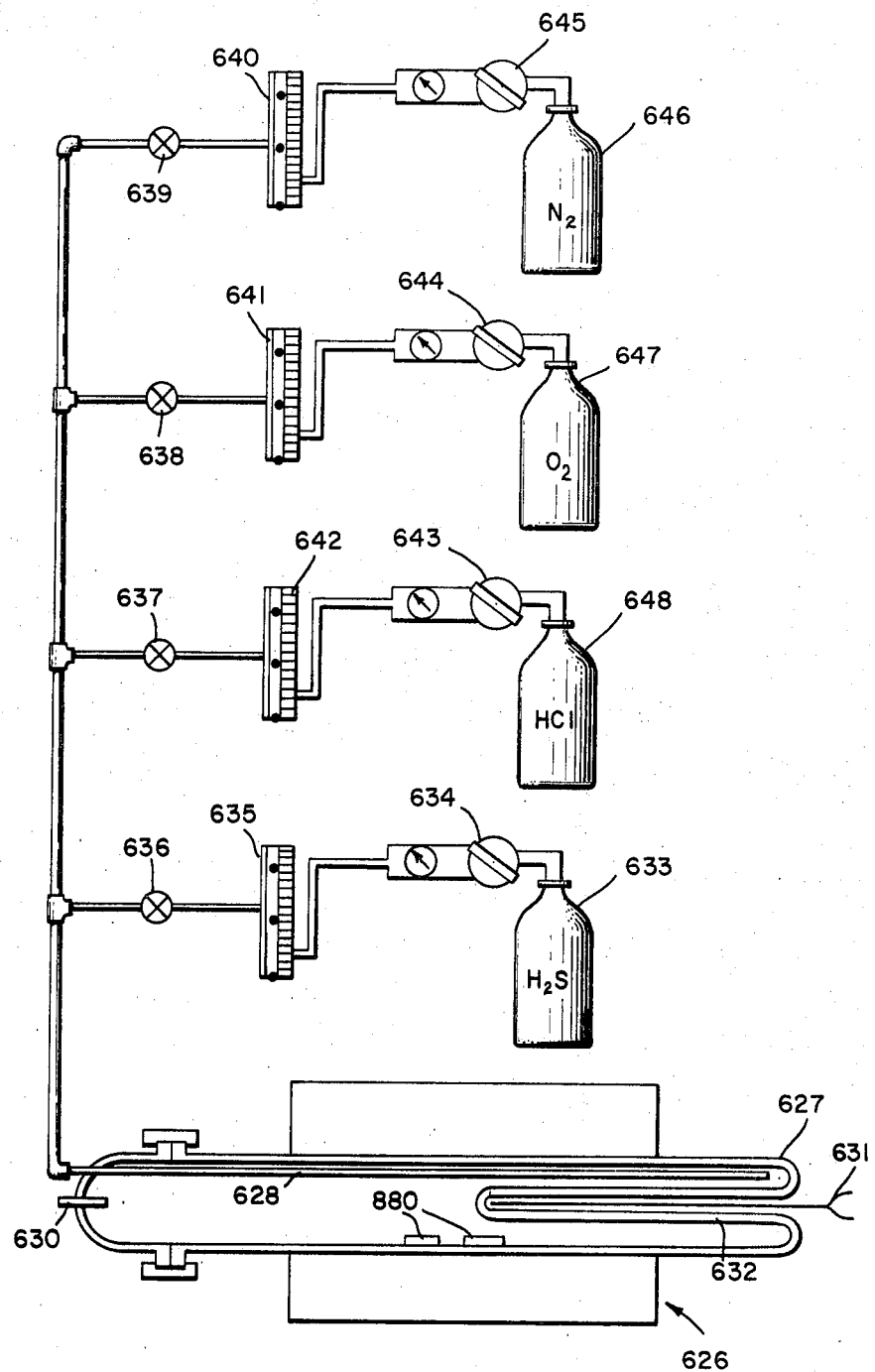
FIG. 8 is a schematic drawing of post deposition thermal processing furnace and processing gas controls.

The fourth step in device fabrication is the post-deposition thermal processing of the structure 880 as it emerges from step three. The preferred process under the present invention can be understood with reference to FIG. 8. A controllable furnace 626 has a quartz processing tube 627 of suitable diameter. A gas inlet tube 628 introduces gas which is preheated by passing through the core of the furnace. The gas exits through short exit tube 630. The temperature (for monitoring and control) near the center of the tube and also near the center of the hot zone is sensed by a thermocouple 631 sheathed in a quartz tube 632. The structures 880 are placed in the tube near the center of the hot zone. A controllable flow of a single gas or a mixture of gases is provided by valve 636, flowmeter 635, regulator 634 for cylinder 633 of $H_2S$; by valve 637, flowmeter 642, regulator 643 for cylinder 648 of HCl; by valve 638, flowmeter 641, regulator 644 for cylinder 647 of $O_2$; and by valve 639, flowmeter 640, regulator 645 for cylinder 646 of $N_2$.

It should be recognized that other configurations, obvious to those skilled in the art, can be used. In operation the following procedure is followed. First the structures 880 are inserted in the processing tube 627 and the tube is flushed out using only the $N_2$ gas from cylinder 646. The furnace is then brought to 300° C, as indicated by thermocouple 631, with $N_2$ flowing at a rate 0.1 to 20 CFH (STP). Nitrogen is used only as a purge medium. At this point the $N_2$ is stopped and the processing gas or gas mixture is introduced into the tube. The percentage by volume of the gases that have been used for processing are summarized below:

$H_2S$: 95 – 100 percent
HCl 0.1 – 2 percent
$N_2$: 0.1 – 5 percent
$O_2$: 0.1 – 0.5 percent The total flow rate is from 0.1 to 20 CFH (STP). It should be noted that the main constituent gas is $H_2S$ and that pure $H_2S$ can be used as the processing gas. The furnace is brought to the desired temperature, typically 500° C, and kept at that temperature for the desired time, typically 30 minutes. Temperatures from 385° to 550° C and times from 1 minute to 60 minutes have been successfully used. The particular time and temperature used depends on the thickness of the CdS film 18 or 48, the substrate 12 or 42 material, and the mixture of gases used. Also the device characteristics, for a given thickness of CdS film, substrate material, and gas, can be altered by changing the temperature and time. After the desired time has elapsed the outside of the quartz tube 627 is exposed to the ambient and allowed to cool in approximately 10 minutes to 300° C, as measured by thermocouple 632, at which point the processing gas or gas mixture is turned off and $N_2$ only is allowed to flow through the tube. When thermocouple 632 indicats 70° C, the structures 880 are removed from the tube and exposed to the ambient.

While this rapid cooling, caused by exposing the outside of the quartz tube 627 to the ambient, produces superior results, devices exhibiting the desired characteristics can also be obtained by allowing the quartz tube 627 to remain completely in the furnace 626 and turning off the power to the furnace. Under these circumstances, the structures 880 cool down at a rate which is slower by a factor of about 10.

The fifth and final step in the device fabrication is the placing of the liquid crystal layer 20 or 50 and counter electrode-glass substrate combination 22 and 24 or 52 and 54 on the subassembly completed in step four. To define the area and thickness of the liquid crystal layer a spacer with an open area in the center, typically made of the insulator Mylar, is placed on the subassembly. The thickness of the spacer is typically 12.5 microns but can be from 6 microns to 25 microns. The liquid crystal is then spread in the open area in the center of the spacer. An excess of the viscous liquid crystal remains until the counter-electrode glass assembly is placed down on the liquid crystal and spacer thereby squeezing the excess liquid crystal out of the center, and maintaining a layer of liquid with no voids. It should be recognized that this procedure is not unique and that other methods known to one skilled in the art could be used to form and define the liquid layer. A supporting clamp is then placed around the device and wires are bonded to the electrodes for electrical contact. The applied dc voltage for operation with either liquid crystal layer 20 or 50 is with the liquid crystal biased negatively with respect to the photoconductor.

The double layer structure consisting of the CdS photoconductor and ZnS insulator allows a higher dark impedance to be obtained in conjunction with the liquid crystal layer than the use of just the CdS film. The higher dark impedance is obtained without significantly altering the light-to-dark impedance ratio. As a result higher contrast between scattering and non-scattering areas in the liquid crystal layer is obtained because of the better impedance match to liquid crystal impedance levels which give efficient scattering. It can be hypothesized that the reason for the improvement of the performance of the photoconductor with the insulating film is due to the improved nucleation of the CdS film on the ZnS film which results in fewer defects through the CdS film. It is also possible that a heterojunction or blocking contact is formed.

It is expected that the photoconductor-insulator structure could be used to improve the performance of photoconductor films of cadmium selenide which has a lower intrinsic resistivity than cadmium sulphide.

In the use, a light having an intensity pattern in accordance with the desired image is projected onto the cell. This will be called the imaging light, in particular sources and arrangements of imaging will be described hereinafter. After imaging is completed, the liquid crystal stored image can be viewed. This viewing can be accomplished either by a projected display light, or by reflective observation of the image by frontal illumination. In either case, a display light is also utilized.

Considering the structure of FIG. 1, both switches 32 and 36 are open. Thereupon, the imaging light is turned on. The imaging light projects the desired image into the cell, both through the nematic-cholesteric mixture liquid crystal and the photoconductive layers. With the imaging light on, the switch 32 is closed for a short time, for example from 0.1 to 1 second. When the voltage, typically from 20 to 150 volts, is applied, the direct current potential field is divided across the liquid crystal layer 20, and the insulator layer 16 and photoconductive layer 18. The imaging light is of such wavelength where the photoconductor is sensitive. For cadmium sulphide, the imaging light is thus between 400 and 520 nanometers. Where there is no imaging light, the photoconductor and insulator layers totally comprise a higher impedance than the liquid crystal. Where the imaging light is projected onto the cell, the resistance of the photoconductor decreases, so that it is less than the liquid crystal. Thus, in the exposed area of the photoconductor, the current is caused to flow to induce change in the scattering properties of the liquid crystal. In the regions where there was no imaging light, the voltage pulse caused by closure of switch 32, the voltage division of such that the principle voltage drop was across the resistor and the photoconductor and the liquid crystal adjacent thereto is uneffective. Thus, this area remains clear. After switch 32 is open, and the imaging light removed, the image is retained in the liquid crystal, because of the scattering storage properties of the nematic-cholesteric mixture.

At a later time, when it is desired to remove the image stored in the liquid crystal, the liquid crystal layer can be brought to its non-scattering state in all regions by closing the switch 36 and applying the ac field across the liquid crystal, from source 34. A frequency greater than about 1,000 cycles per second is required to effect erasure and return the liquid crystal to the clear state. Closure of the switch 36 for 0.5 to 2 seconds is adequate to obtain this erasure.

In the structure of FIG. 2, the liquid crystal 50 is a nematic material. There is no optical memory, in the sense of scattering condition of such a material, in the absence of a continuously applied field. The employment of the dc field provided by dc source 60 and closure of its switch 62 is alternative to the application of the dc field superimposed upon the ac field, by closure of switch 72. The dc field provided by source 60 is from 10 to 100 volts. On the other hand, the combined field comprises a dc potential from source 68 of from 10 to 100 volts, together with an ac potential from source 70 of from 10 to 100 volts rms at a frequency in the range of from 1,000 to 20,000 cycles per second. With either of the switches 62 or 72 closed, the imaging light is turned on. The imaging light is of such wavelength that it affects the photoconductor. In the case of the cadmium sulphide, the imaging light has a wavelength from 400 to 520 nanometers. The illumination light, either for frontal or projective viewing of the images of the liquid crystal, is of such wavelength that the photoconductor is not photosensitive thereto. In the case of cadmium sulphide, the projection light has a wavelength above 520 nanometers. In this mode, the information supplied by the imaging light is displayed in real time by the viewing light. This is accomplished because the regions where the photoconductor is of lower impedance due to the incidence of light, the voltage drop is substantially taken across the liquid crystal, and this causes dynamic scattering in that region. In the regions where the imaging light does not occur, the principle part of the voltage drop is across the photoconductor, so that the voltage drop across the nematic liquid crystal is not sufficient to cause scattering. Therefore, in those areas the liquid crystal remains transparent.

In order to achieve real time imaging, the use of the combined dc and ac field is preferred to the ordinary dc field provided by the dc source 60. The normal decay time of the nematic liquid crystal under the influence of the dc field, and without illumination, may not be sufficient to provide the real time display. Therefore, the superimposed ac wave quickly erases the image in areas where the imaging light has been removed.

In general, a cadmium sulphide photoconductor film of the type specified, when used alone and when used in the mode necessary for the operation described, would not have the sufficiently high impedance or sensitivity necessary for the described operation of either the cells 10 or 40. By the use of the double layered structure described, the necessary properties can be obtained.

A summary of some of the characteristics measured on laboratory models of the nematic-cholesteric device are summarized below:

| | |
|---|---|
| Resolution | >25 line pairs/mm |
| Sensitivity | <0.1 mj/cm$^2$(466.0 to 520.0 nm) |
| Turn on | 0.1 sec |
| Erase Time | ~1 sec |
| Storage Time | Many Days |
| Contrast | >5:1 (no half-tone reproduction) |

The sheet resistivity of the zinc sulphide insulator layer is greater than $10^{15}$ ohms per square. The sheet resistivity of the cadmium sulphide photoconductor layer in the dark state is greater than $10^{12}$ ohms per square. The dark resistivity of the liquid crystal layer is greater than $10^{12}$ ohms per square. The complete cell has a light to dark current ratio of about 20 to 1. The complete cell has a conductance of about 10 microamperes per square centimeter at 40 V DC in the dark state.

The manner of use of the cells 10 and 40 is described with respect to FIGS. 3 through 6. Referring to FIG. 3, the cell 78 could be either of the cells 10 or 40, equiped with the electric application means described with respective FIGS. 1 and 2. The cell 78 is positioned between a source of visible light 80 which serves as a projection light and screen 82.

A source of visible imaging light 84 provides visible radiation for photoactivating the photoconductor layer 18 inside the cell 78, the photoconductor layer in this instance being on the left side of the cell facing the sources 80 and 84. By this arrangement, images formed inside the liquid crystal layer of the cell may be portrayed on the screen 82. As is typical, the imaging light from the source 84 is of a shorter wavelength than the display light from the source 80. If the nematic liquid crystal layer is transparent to imaging light, the cell 78 can be turned around so that the photoconductor layer is on the right side of the cell 78 facing the screen 82 with the source 84 to the left of the cell thus being arranged to expose the photoconductor material layer by transmission of light from source 84 through the liquid crystal layer to the photoconductor material layer.

FIG. 4 shows the cell 86 arranged between a projection light 88 and a screen 90. This is similar to FIG. 3 except that a partial mirror 92 is used in the optical path between the imaging source 98 and the cell 86, and in the optical path between the projection of display light 88 and the screen 90. In this instance, the photoconductor layer inside the cell is disposed on the side of the cell closest to the screen with the liquid crystal layer being disposed on the side of the cell closest to the source 88. The partial mirror 92, as indicated, has the property of transmitting light from source 88 to the screen 90 and reflecting light from the imaging source 94 to the cell 86. A half silvered mirror may be used for this purpose. In the alternative, which is preferred, a dichroic mirror is used for the partial mirror 92 in which case most of the light from the source 88 reaching the mirror is transmitted therethrough toward the screen 90 and most of the light from the source 94 is reflected by the mirror toward the cell 86. The cell 86 can be either cell 10 or cell 40.

In FIG. 5, the cell 96 is disposed in front of a cathode ray tube 90 and a lens 100. Image light from the fluorescent screen of the cathode ray tube is focused onto the photoconductor material layers, of the cell 100 to write an image on the photoconductor material layer. Display light, provided by ambient light or by a display light source, is reflected from the cell 96 to display the resultant image written into the nematic liquid crystal layer. In FIG. 6, the cell 102 is attached to the front panel of the cathode ray tube 104 by a panel 106 of optical fibers which convey imaging light from the fluorescent display screen of the cathode ray tube to the cell's photoconductor layer.

The cell 96 and the cell 102, with their electric fields, can be either the type described with respect to FIG. 1, or the type described with respect to FIG. 2. With either of these cells, the imaging light is provided by the cathode ray tube, which provides an image in accordance with the cathode ray tube display driven by the cathode ray tube drive information, identified in FIGS. 5 and 6 as the projection circuit. The cells of FIGS. 5 and 6 have a reflected display, so that display light is provided from the face of the cell, as contrasted to the display light of FIGS. 3 and 4 which was projected through the cells.

Good image quality is a high contrast ratio in the projected image. This implies high light scattering in the liquid crystal film next to the activated regions of the photoconductor, and zero or or low light scattering in the unactivated regions. With a single layer of CdS it is not possible to get as good an image quality and high sensitivity in conjunction with a liquid crystal layer. The reason for this is that the CdS film by itself is not of high enough dark impedance to effectively match the impedance of efficient scattering liquid crystal material. With the double layer structure consisting of the ZnS insulator film and the CdS photoconductor film, constructed in the manner disclosed, the dark impedance is raised without reducing the light-to-dark current ratio which determines the sensitivity of the device. Thus the benefits to be accrued are improved device performance consisting of improved contrast ratio in the projected image, and improved sensitivity to the input (write) light signal.

This invention having been described in its preferred embodient, it is clear that it is susceptible to numerous modifications and embodiments within the ability of one skilled in the art and without the exercise of the inventive faculty. Accordingly, the scope of this invention is defined by the scope of the following claims.

What is claimed is:

1. A liquid crystal device having a photoactive portion and having a plurality of layers defining the photoactive portion of said liquid crystal device, said layers comprising:
   a first electrically-conductive layer and a second electrically-conductive layer, said electrically-conductive layers being connectable for application of an electric field between said electrically-conductive layers;
   a layer of liquid crystal which is operable in a scattering mode positioned between said electrically-conductive layers;
   a layer of photoconductive material positioned between said electrically-conductive layers, the improvement comprising:
   a layer of high electrical impedance located between said electrically-conductive layers so that, upon application of an electric field between said electrically-conductive layers, the voltage division of the electric field between said high impedance layer, said liquid crystal layer, and said photoconductive layer is dependent upon the state of photoactivation of said photoconductive layer.

2. The device of claim 1 wherein said layer of high electrical impedance has an impedance in excess of $10^{12}$ ohms per square.

3. The device of claim 1 wherein said layer of liquid crystal is a layer of nematic liquid crystal operable in the dynamic scattering mode.

4. The device of claim 1 wherein said layer of liquid crystal is a layer of cholesteric-containing liquid crystal operable in the emulsion storage scattering mode.

5. The device of claim 4 wherein said liquid crystal is a mixture of nematic and cholesteric liquid crystal materials and is operable in the emulsion storage scattering mode.

6. The device of claim 1 wherein said layer of high electrical impedance is a layer of zinc sulfide.

7. The device of claim 6 wherein said layer of high electrical impedance has an impedance in excess of $10^{12}$ ohms per square.

8. The device of claim 1 wherein said layer of high electrical impedance has a higher electrical impedance than the dark impedance of said photoconductor layer.

9. The device of claim 8 wherein said layer of high electrical impedance is a layer of zinc sulfide.

10. The device of claim 1 wherein said layer of high electrical impedance has an impedance greater than $10^{15}$ ohms per square, said layer of liquid crystal has a dark impedance greater than $10^{12}$ ohms per square, and said layer of photoconductive material has a dark impedance greater than $10^{12}$ ohms per square.

11. The device of claim 10 wherein said layer of high electrical impedance is a layer of zinc sulfide.

12. The device of claim 10 wherein said photoconductor layer is a layer of cadmium sulfide.

13. The device of claim 12 wherein said layer of high electrical impedance is a layer of zinc sulfide.

14. The device of claim 13 wherein said electrically-conductive layers are cover plates, one of which is substantially transparent to light of a wavelength to which said photoconductor layer is sensitive so that said cover plates, said electrically-conductive layers, and the layers therebetween form said cell.

15. The device of claim 14 further includes means connected to said first and second electrically-conductive layers for applying an electric field between said electrically-conductive layers.

16. The device of claim 15 wherein said means is a source of direct current.

17. The device of claim 15 wherein said means is a source of alternating current.

18. The device of claim 15 wherein said means includes sources of both direct and alternating current.

* * * * *